Dec. 7, 1926.                                                           1,609,815
                        J. P. HAINZIGIANIS
                  VEHICLE DOOR OPENING AND CLOSING DEVICE
                        Filed May 29, 1925          2 Sheets-Sheet 1

WITNESSES                                                INVENTOR
E. A. Wilson                                       JAMES P. HAINZIGIANIS
A. L. Kitchin                                            BY
                                                             ATTORNEYS Dec. 7, 1926. 1,609,815
J. P. HAINZIGIANIS
VEHICLE DOOR OPENING AND CLOSING DEVICE
Filed May 29, 1925 2 Sheets-Sheet 2

WITNESSES
E. A. Wilson
A. L. Kitchin

INVENTOR
JAMES P. HAINZIGIANIS
BY
ATTORNEYS

Patented Dec. 7, 1926.

1,609,815

UNITED STATES PATENT OFFICE.

JAMES P. HAINZIGIANIS, OF NEW YORK, N. Y.

VEHICLE DOOR OPENING AND CLOSING DEVICE.

Application filed May 29, 1925. Serial No. 33,747.

This invention relates to vehicle door opening and closing devices and has for an object to provide an improved construction particularly adapted for taxi cabs or other automobiles wherein means are provided which will permit the driver to readily open and close either door without moving from his seat.

Another object of the invention is to provide a door opening and closing device wherein means are provided capable of operation by the passenger or operation by the driver from his seat, the structure being such that it may be readily used on automobiles or any other desired form of vehicle.

A further object of the invention, more specifically, is to provide a door opening and closing device wherein means are provided for first unlocking the door and then swinging the same to an open position, the structure being such that upon swinging the door to a closed position the door will automatically lock.

In the accompanying drawings—

Figure 1:
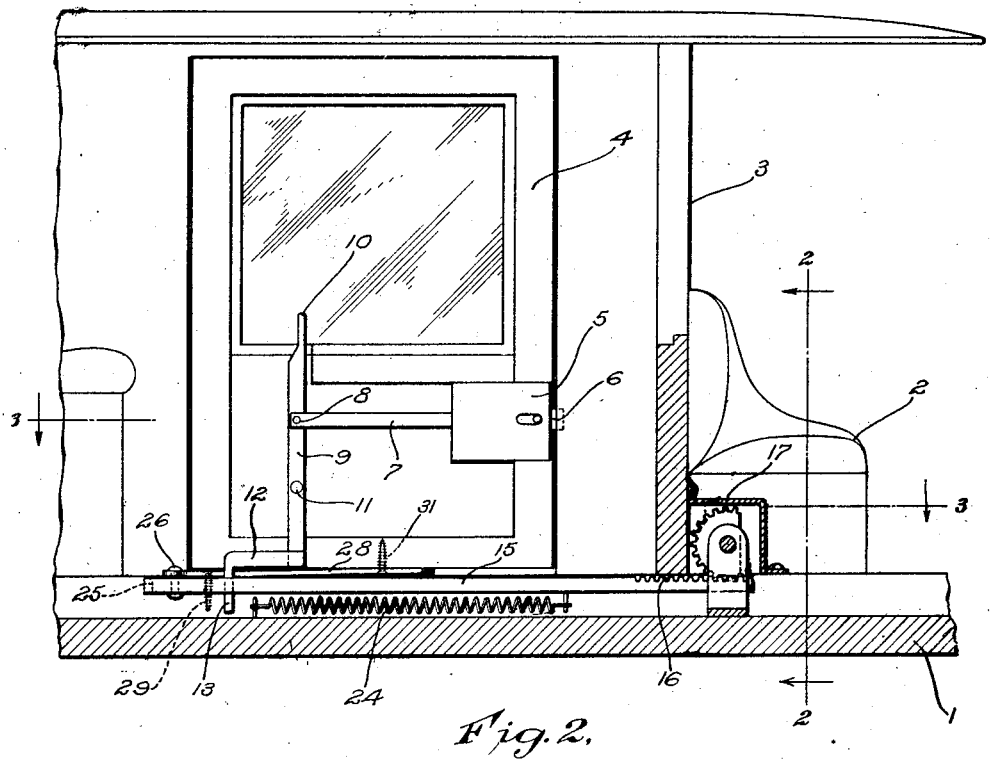
Figure 1 is a longitudinal vertical sectional view through the front part of an automobile with an embodiment of the invention applied thereto, said section being taken on line 1—1 of Figure 3.
Figure 2:
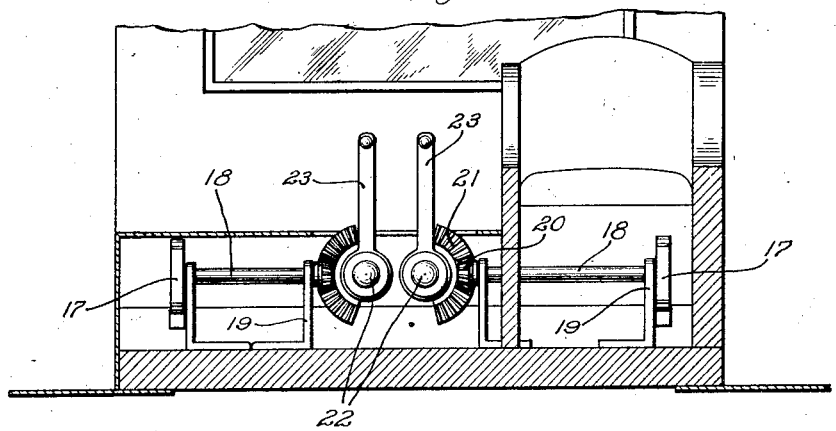
Figure 2 is a fragmentary sectional view through Figure 1 on line 2—2.
Figure 3:
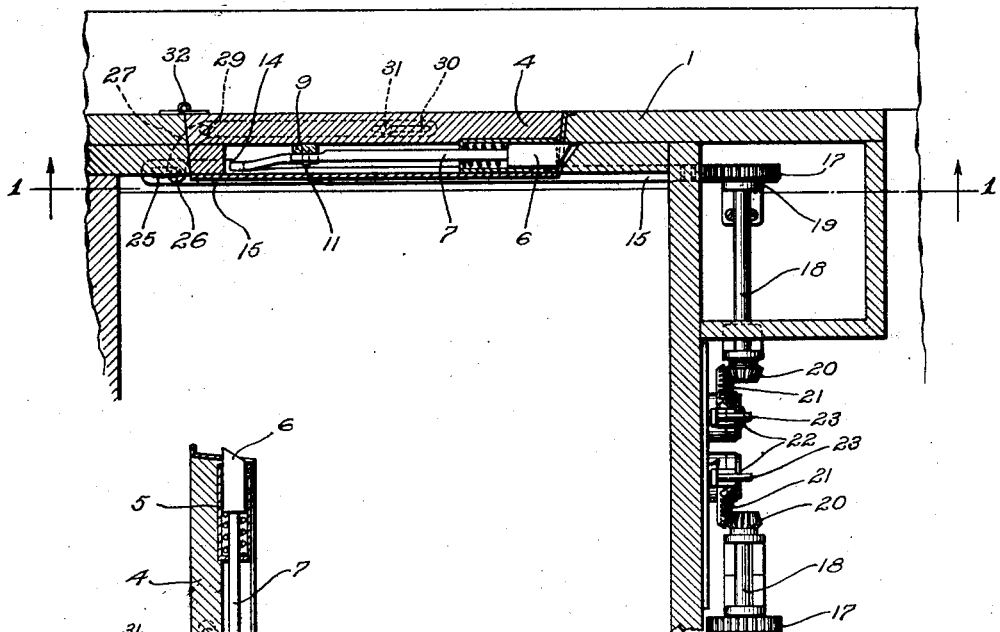
Figure 3 is a horizontal sectional view through Figure 1 on line 3—3.
Figure 4:
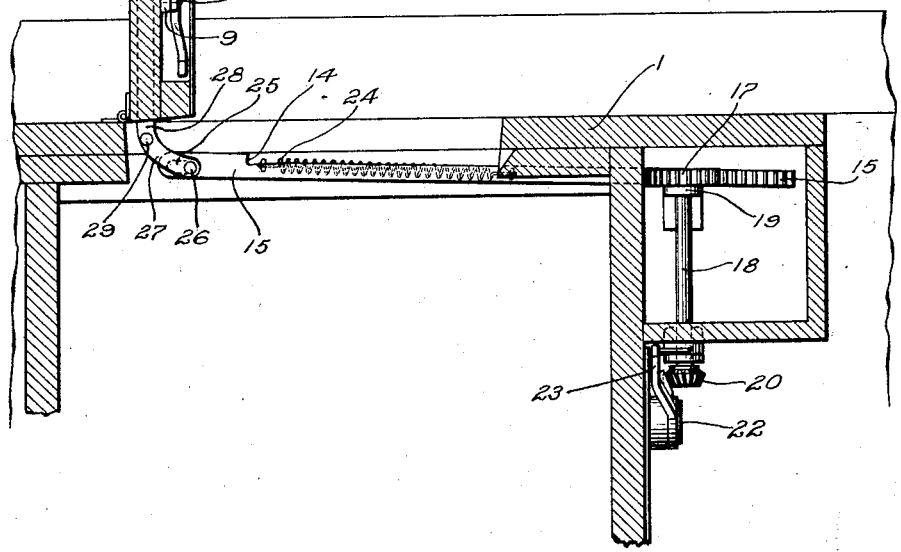
Figure 4 is a view similar to Figure 3 but showing one of the doors in an open position.

Referring to the accompanying drawing by numerals, 1 indicates a vehicle which may be of any desired kind, as for instance, an ordinary taxi cab with a seat 2 and a front wall structure 3 which separates the driver from the passengers. The vehicle 1 is provided with a door 4 on each side, which door is of the usual construction found in taxi cabs, the same being hingedly supported so that they may be swung open and closed as desired. Each door is provided with a lock 5 which includes a sliding bolt or catch 6 which is spring pressed in the usual manner so that it will move to a locked position whenever the door is fully closed. A rod 7 is connected with the catch or bolt 6, said rod in turn being pivotally connected at 8 with a hand lever 9 projecting to a convenient point so that the grip 10 may be grasped by a passenger and the lever moved to the left in Figure 1 whereupon the bolt or catch 6 will be released and the door may be opened. The lever 9 is pivotally mounted at 11 on the door 4 and also extends down to near the lower end of the door. An L-shaped member 12 is rigidly connected to the lower end of lever 9, said member 12 having the depending pin or section 13 projecting into the line of movement of the shoulder 14 of a reciprocating bar 15. The bar 15 at the end opposite the shoulder 14 is formed with teeth 16 whereby a rack structure is presented designed to be continually in mesh with the gear 17. The gear 17 is rigidly secured to a shaft 18 supported in suitable brackets 19 and carrying a comparatively small bevel pinion 20 at the end opposite the gear 17. The pinion 20 continually meshes with a segmental bevel gear 21 which is pivotally mounted on a pin 22 and which is rigidly secured to a crank 23. When the crank 23 is swung in one direction, rack 16 will be moved to the position shown in Figure 4 against the action of spring 24 which is secured at one end to the bar 15 and the other to some part of the automobile 1. The bar 15 is provided with a slot 25 through which the pin 26 extends, said pin being rigidly connected with the bent or offset end 27 of the bar 28, which bar is pivotally mounted at 29 on the automobile 1. The bar 28 at the outer end is provided with a slot 30 accommodating the pin 31 rigidly connected with the door 4. The slot 30 is necessary because the hinges 32 of door 4 are offset on the pin 29. When the door is closed as shown in Figure 3, it will be noted that the shoulder 14 is resting against the pin or section 13 of member 12. On the first movement of the bar 15, rack 16 and associated parts, lever 9 will be swung for disengaging the catch or bolt 6. The swinging movement will continue until pin 26 is engaged at the opposite end of slot 25 whereupon a continued movement of the bar 15 will pull on the section 27 and quickly swing the door 4 to an open position. As soon as the crank 23 has been released, spring 24 will automatically move the bar 15 back to the position shown in Figure 4 so that when the crank 23 is positively moved for closing the door or where the door is closed manually, shoulder 14 will be in back of the pin 13.

By reason of the construction described, it will be noted that the driver may open and close either door without leaving his seat and the occupant or passenger may open and close either door without disturbing the driver. It will also be noted that the opening and closing means do not in any way prevent the usual lock or catch from holding the respective doors closed.

What I claim is:

1. In a vehicle door opening and closing device, the combination with a vehicle body having a hinged door provided with a spring latch, of a latch operating lever pivoted to the door and having an L-shaped member at its lower end, a sliding and spring pressed bar provided with a slot in its rear end, a shoulder adjacent the slot with which the L-shaped members of the latch operating lever is adapted to engage, means connected with the forward end of the bar for operating it, and a bar pivoted intermediate of its ends to the body in front of the hinge of the door and having at one end a pin and slot connection with the door, the said bar having at its other end an offset portion provided with a pin working in the slot of said sliding bar.

2. In a vehicle door opening and closing device, the combination with a vehicle body having a hinged door provided with a spring latch, of a latch operting lever mounted on the door and having a depending pin at its lower end, a sliding and spring pressed bar having a slot at its rear end and a stop adjacent the slot and with which the pin of the latch operting lever is adapted to engage, means connected with the forward end of the bar for operating it, and a bar pivoted to the body intermediate of its ends in front of the hinge of the door, and having one end slidably connected with the door and having at its other end an offset portion provided with a pin working in the slot of the sliding bar.

3. In a vehicle door opening and closing device, the combination with a vehicle body having a door provided with a spring latch, of a latch operting lever pivoted to the door and having a member extending below the door, a sliding and spring pressed bar having a rack at its forward end and a stop adjacent its rear end, and with which the member of the operating lever engages, a member carried by the body and with which the said bar has a sliding connection, a shaft at the forward part of the body and having a gear wheel at one end meshing with the rack of the sliding bar and a bevel pinion at the other end, a segmental bevel gear meshing with the bevel pinion of the shaft, and a crank carried by the segmental gear.

JAMES P. HAINZIGIANIS.